United States Patent [19]

Arakawa et al.

[11] Patent Number: 4,645,721

[45] Date of Patent: Feb. 24, 1987

[54] RADIATION IMAGE STORAGE PANEL

[75] Inventors: Satoshi Arakawa; Terumi Matsuda, both of Kanagawa, Japan

[73] Assignee: Fuji Photo Film Co., Ltd., Japan

[21] Appl. No.: 818,239

[22] Filed: Jan. 13, 1986

[30] Foreign Application Priority Data

| | | | |
|---|---|---|---|
| Jan. 14, 1985 | [JP] | Japan | 60-5509 |
| May 17, 1985 | [JP] | Japan | 60-106750 |
| May 17, 1985 | [JP] | Japan | 60-106751 |

[51] Int. Cl.$^4$ .......................... G03G 5/16; B32B 9/00; B32B 19/00

[52] U.S. Cl. ................................ 428/690; 250/327.2; 250/483.1

[58] Field of Search .......................... 250/327.2, 483.1; 428/690, 691, 913

[56] References Cited

U.S. PATENT DOCUMENTS

| | | | |
|---|---|---|---|
| 2,186,757 | 1/1940 | Kallmann et al. | 250/327.2 |
| 3,353,983 | 11/1967 | Guyot | 428/690 X |
| 4,501,796 | 2/1985 | Kitada | 428/690 X |
| 4,508,636 | 4/1985 | Ochiai | 428/690 X |

*Primary Examiner*—Nancy A. B. Swisher
*Attorney, Agent, or Firm*—Gerald J. Ferguson, Jr.; Michael P. Hoffman; Ronni S. Malamud

[57] ABSTRACT

A radiation image storage panel comprising a support, a phosphor layer which comprises a binder and a stimulable phosphor dispersed therein and a protective film, superposed in this order, characterized in that a thin film comprising an inorganic material is provided on a surface of the panel.

10 Claims, No Drawings

RADIATION IMAGE STORAGE PANEL

BACKGROUND OF THE INVENTION

1. Field of the Invention

This invention relates to a radiation image storage panel employed in a radiation image recording and reproducing method utilizing a stimulable phosphor.

2. Description of Prior Arts

For obtaining a radiation image, there has been conventionally employed a radiography utilizing a combination of a radiographic film having an emulsion layer containing a photosensitive silver salt and a radiographic intensifying screen.

As a method replacing the conventional radiography, a radiation image recording and reproducing method utilizing a stimulable phosphor as described, for instance, in U.S. Pat. No. 4,239,968, has been recently paid much attention. In the radiation image recording and reproducing method, a radiation image storage panel comprising a stimulable phosphor (i.e., stimulable phosphor sheet) is used, and the method involves steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at considerably smaller dose, as compared with the conventional radiography. Accordingly, this method is of great value especially when the method is used for medical diagnosis.

The radiation image storage panel employed in the radiation image recording and reproducing method has a basic structure comprising a support and a phosphor layer provided on one surface of the support. Further, a transparent film is generally provided on the free surface (surface not facing the support) of the phosphor layer to keep the phosphor layer from chemical deterioration or physical shock.

The phosphor layer comprises a binder and stimulable phosphor particles dispersed therein. The stimulable phosphor emits light (gives stimulated emission) when excited with an electromagnetic wave (stimulating rays) such as visible light or infrared rays after having been exposed to a radiation such as X-rays. Accordingly, the radiation having passed through an object or having radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating (scanning) the panel with stimulating rays. The stimulated emission is then photoelectrically detected to give electric signals, so as to reproduce a visible image from the electric signals.

The radiation image recording and reproducing method is very useful for obtaining a radiation image as a visible image as described hereinbefore, and it is desired for the radiation image storage panel employed in the method to have a high sensitivity and provide an image of high quality (high sharpness, high graininess, etc.), as well as the radiographic intensifying screen employed in the conventional radiography.

When the radiation image recording and reproducing method is practically carried out, the radiation image storage panel is repeatedly used in a cyclic procedure comprising steps of exposing the panel to a radiation (i.e., recording a radiation image), irradiating the panel with stimulating rays (i.e., reading out the recorded radiation image), and exposing the panel to light for erasure (i.e., erasing the remaining energy from the panel). In the cyclic procedure, the panel is moved from one step to the next step through a transfer system, and after one cycle is finished, the panel is usually piled upon other panels and stored.

In the repeated use of the radiation image storage panel involving the transfer and the pile, various troubles are apt to occur. For instance, both of a surface and a back surface of the panel are damaged by physical contact such as rubbing of a surface (the protective film-side surface) of a panel against a back surface (the support-side surface) of another panel, or rubbing of a surface or back surface of a panel against an edge of another panel, when the panel is piled on the other panels or moved from the pile to the transfer system. The radiation image is generally read out by scanning the transparent protective film-side surface of the panel with stimulating rays, and the physical damage given on the surface of the protective film is liable to cause scattering of the stimulating rays in the read-out operation and the like. As a result, the quality of an image such as uniformity of image tends to be deteriorated.

Accordingly, the radiation image storage panel is desired to be kept from damage on the protective film-side surface thereof at a minimum level in the transferring or piling procedure.

The sensitivity of the radiation image storage panel substantially depends on the amount of stimulated emission given by the stimulable phosphor contained therein, and the emission amount depends upon the emission characteristics of the phosphor itself, as well as the intensity of stimulating rays for causing the phosphor to emit light when the stimulating rays do not have an enough intensity.

There is another problem that stimulating rays are not sufficiently absorbed by the radiation image storage panel, since a portion of the stimulating rays is reflected by the panel surface and does not reach the phosphor layer. Particularly in the case of employing a semiconductor laser which is intended to use practically as a source of stimulating rays, it is required to increase effectiveness thereof to the panel owing to its small output power and to enhance the sensitivity of the panel. The great reflection of the stimulating rays on the panel surface brings about double reflection by the read-out system (e.g., photosensor) and the reflected rays then enter the panel to excite areas other than the area to be irradiated (which is called flare phenomenon). Since the image information recorded on the other parts are read out at the same time, the obtained image information becomes less accurate. Also from this viewpoint, the surface reflection of the panel is desired to be as small as possible.

Further, both of the surface and back surface (protective film-side surface and support-side surface) of the radiation image storage panel, which are usually made of polymer materials, are apt to be electrically charged in the transferring and piling procedure by the above-mentioned physical contacts and rubbing a panel surface against transfer means such as roll and belt. Thus electrically charged panel causes certain problems. For instance, a charged surface of a panel and a charged back surface of another panel easily adhere to each other and thus combined two panels are together moved to the transfer system, so that the subsequent procedure cannot be performed nomarlly. The dust in the air also tends to deposit to the charged panel surface, so that stimulating rays are scattered by the dust on the panel surface in the read-out operation to provide an image of lowered quality. Accordingly, it is also desired to reduce the electrification of the panel surface at a minimum level.

SUMMARY OF THE INVENTION

It is an object of the present invention to provide a radiation image storage panel having a high hardness on the panel surface.

It is another object of the present invention to provide a radiation image storage panel improved in the resistance to damage on the panel surface.

It is further object of the present invention to provide a radiation image storage panel improved in the sensitivity.

It is still further object of the present invention to provide a radiation image storage panel which is improved in the sensitivity and provides an image of high quality.

It is still further object of the present invention to provide a radiation image storage panel improved in an antistatic property.

The objects can be accomplished by a radiation image storage panel comprising a support, a phosphor layer which comprises a binder and a stimulable phosphor dispersed therein and a protective film, superposed in this order, characterized in that a thin film comprising an inorganic material is provided on a surface of the panel.

In the present specification, the term of "surface of the panel" means a panel surface on the side to which stimulating rays are applied. Generally, the application of stimulating rays is done from the protective film-side in the practice of the radiation image recording and reproducing method emplcying the panel. Accordingly, the thin film comprising an inorganic material is generally provided on the surface of the protective film.

According to the present invention, a thin film comprising an inorganic material such as an inorganic metal compound is provided by deposition etc., on the panel surface on the side to be irradiated with stimulating rays, so as to increase the hardness of the panel surface.

The high surface hardness can substantially depress the occurrence of damage such as scratches on the surface of the panel when the panel surface is in contact with a back surface or edge of another panel in a radiation image recording and reproducing apparatus. Accordingly, the lowering of image quality caused by the damage on the panel surface can be prevented.

Particularly, provision of a thin film comprising one or more of inorganic nitride, inorganic carbide, inorganic oxide and inorganic fluoride can remarkably prevent the panel from suffering the damage such as scratches on the panel surface in the repeated use of the panel involving the transferring and piling.

Further, provision of a thin film comprising an inorganic material having a small reflectance such as inorganic fluoride or inorganic oxide can increase the effectiveness of stimulating rays to enhance the sensitivity of the panel. More in detail, the provision of such thin film at a suitable thickness can reduce the reflection of the stimulating rays on the panel surface and increase the absorption thereof by the phosphor layer. Even when the panel is irradiated with stimulating rays having a weak intensity, there is obtained a large amount of stimulated emission given by the stimulable phosphor in the phosphor layer, and the sensitivity of the panel is enhanced. Especially in the case that the source of the stimulating rays is one having a small output power such as a semiconductor laser or that the intensity of the stimulating rays should be kept low because of the read-out condition etc., the increase of the effectiveness of the stimulating rays to the panel is very advantageous.

The above-described flare phenomenon due to the double reflection of the reflected stimulating rays by another object can be also prevented, and accurate image information can be obtained. Accordingly, employment of the panel provided with the thin film having the anti-reflection property in the radiation image recording and reproducing method can mitigate the restriction of the source of stimulating rays and the read-out system. The radiation image recording and reproducing apparatus can be made more conpact or can provide higher speed processing, and it is possible to broaden the appliable field of the method.

Otherwise, provision of a thin film comprising an inorganic material having a conductive property such as a conductive inorganic oxide can remarkably increase the antistatic property of the panel surface, so as to improve the transfer characteristics of the panel and prevent the deposit of dust to the panel surface. More in detail, the provision of such conductive thin film comprising a metal oxide etc., on the panel surface can prevent the panel surface from electrically charging. Accordingly, it is prevented that two panels in the piling state are moved together to the transfer system in the combined state. Further, it is prevented that the dust deposits to the panel surface to lower the image quality.

DETAILED DESCRIPTION OF THE INVENTION

The radiation image storage panel of the present invention having the above-described advantages can be prepared, for instance, in the following manner.

The support material employed in the present invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provided thereby. For instance, a subbing layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided on the support.

As described in U.S. patent application Ser. No. 496,278, now U.S. Pat. No. 4,575,635, the phosphor layer-side surface of the support (or the surface of a subbing layer, light-reflecting layer, or light-absorbing layer in the case that such layers are provided on the phosphor layer) may be provided with protruded and depressed portions for enhancement of the sharpness of the image.

On the support, a phosphor layer is formed. The phosphor layer basically comprises a binder and stimulable phosphor particles dispersed therein.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, BaO.x$Al_2O_3$:Eu, in which x is a number satisfying the condition of $0.8 \leqq x \leqq 10$, and $M^{II}$O.x$SiO_2$:A, in which $M^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,236,078;

$(Ba_{1-x-y},Mg_x,Ca_y)$FX:a$Eu^{2+}$, in which X is at least one element selected from the group consisting of Cl and Br, x and y are numbers satisfying the conditions of $0<x+y \leqq 0.6$, and $xy \neq 0$, and a is a number satisfying the condition of $10^{-6} \leqq a \leqq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0<x<0.1$, as described in the above-mentioned U.S. Pat. No. 4,236,078;

$(Ba_{1-x},M^{2+}_x)$FX:yA, in which $M^{2+}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}$FX.xA:yLn, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0<y \leqq 0.2$, respectively, as described in Japanese Patent Provisional Publication No. 55(1980)-160078;

$(Ba_{1-x}, M^{II}_x)F_2$.a$BaX_2$:yEu,zA, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 10^{-2}$, respectively, as described in Japanese Patent Provisional Publication No. 56(1981)-116777;

$(Ba_{1-x},M^{II}_x)F_2$.a$BaX_2$:yEu,zB, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<x \leqq 2 \times 10^{-1}$, respectively, as described in Japanese Patent Provisional Publication No. 57(1982)-23673;

$(Ba_{1-x}, M^{II}_x)F_2$.a$BaX_2$:yEu,zA, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 5 \times 10^{-1}$, respectively, as described in Japanese Provisional Publication No. 57(1982)-23675;

$M^{III}$OX:xCe, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0<x<0.1$, as described in Japanese Patent Provisional Publication No. 58(1983)-69281;

$Ba_{1-x}M_{x/2}L_{x/2}$FX:y$Eu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0<y \leqq 0.1$, respectively, as described in U.S. patent application No. 497,805, now abandoned;

BaFX.xA:y$Eu^{2+}$, in which X is at least one halogen selected from the group consisting of Cl, Br and I; A is at least one fired product of a tetrafluoroboric acid compound; and x and y are numbers satisfying the conditions of $10^{-6}$—$x \leqq 0.1$ and $0<y \leqq 0.1$, respectively, as described in U.S. patent application No. 520,215, now abandoned;

$BaFx{:}xA{:}yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0 < y < 0.1$, respectively, as described in U.S. patent application No. 502,648, now abandoned;

$BaFx.xNaX'{:}aEu^{2+}$, in which each of X and X' is at least one halogen selected from the group consisting of Cl, Br and I; and x and a are numbers satisfying the conditions of $0 < x \leqq 2$ and $0 < a \leqq 0.2$, respectively, as described in Japanese Patent Provisional Publication No. 59(1984)-56479;

$M^{II}FX.xNaX'{:}yEu^{2+}{:}zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leqq 2$, $0 < y \leqq 0.2$ and $0 < z \leqq 10^{-2}$, respectively, as described in U.S. patent application No. 535,928, now U.S. Pat. No. 4,505,989;

$M^{II}FX.aM^{I}X'.bM'^{II}X''_2.cM^{III}X'''_3.xA{:}yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leqq a \leqq 2$, $0 \leqq b \leqq 10^{-2}$, $0 \leqq c \leqq 10^{-2}$ and $a+b+c \leqq 10^{-6}$; and x and y are numbers satisfying the conditions of $0 < x \leqq 0.5$ and $0 < y \leqq 0.2$, respectively, as described in U.S. patent application No. 543,326, now abandoned;

$M^{II}X_2.aM^{II}X'_2{:}xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leqq a \leqq 10.0$ and $0 < x \leqq 0.2$, respectively, as described in U.S. patent application No. 660,987, now abandoned;

$M^{II}FX.aM^{I}X'{:}xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 \leqq a \leqq 4.0$ and $0 < x \leqq 0.2$, respectively, as described in U.S. patent application No. 668,464, now abandoned; and $M^{I}X{:}xBi$, in which $M^{I}$ is at least one alakli metal selected from the group consisting of Rb and Cs; X is at least one halogen selected from the group consisting of Cl, Br and I; and x is a number satisfying the condition of $0 < x \leqq 0.2$, as described in Japanese Patent Application No. 60(1985)-70484.

The $M^{II}X_2.aM^{II}X'_2{:}xEu^{2+}$ phosphor described in the above-mentioned U.S. patent application No. 660,987, now abandoned, may contain the following additives in the following amount per 1 mol of $M^{II}X_2.aM^{II}X'_2$:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0 < b \leqq 10.0$, as described in U.S. patent application No. 699,325;

$bKX''.cMgX'''_2.dM^{III}LLX''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0 \leqq b \leqq 2.0$, $0 \leqq c \leqq 2.0$, $0 \leqq d \leqq 2.0$ and $2 \times 10^{-5} \leqq b+c+d$, as described in U.S. patent application No. 723,819, now abandoned;

yB, in which y is a number satisfying the condition of $2 \times 10^{-4} \leqq y \leqq 2 \times 10^{-1}$, as described in U.S. patent application No. 727,974;

bA, in which S is at least one oxide selected from the group consisting of $SiO_2$ and $P_2O_5$; and b is a number satisfying the condition of $10^{-4} \leqq b \leqq 2 \times 10^{-1}$, as described in U.S. patent application No. 727,972;

bSiO, in which b is a number satisfying the condition of $0 < b \leqq 3 \times 10^{-2}$, as described in Japanese Patent Application No. 59(1984)-240452;

$bSnX''_2$, in which X'' is at least one halogen selected from the group consisting of F, Cl, Br and I; and b is a number satisfying the condition of $0 < g \leqq 10^{-3}$, as described in Japanese Patent Application No. 59(1984)-240454;

$bCsX''.cSnX'''_2$, in which each of X'' and X''' is at least one halogen selected from the group consisting of F, Cl, Br and I; and b and c are numbers satisfying the conditions of $0 < b \leqq 10.0$ and $10^{-6} \leqq c \leqq 2 \times 10^{-2}$, respectively, as described in Japanese Patent Application No. 60(1985)-78033; and $bCsX''.yLn^{3+}$, in which X'' is at least one halogen selected from the group consisting of F, Cl, Br and I; Ln is at least one rare earth selected from the group consisting of Sc, Y, Ce, Pr, Nd, Sm, Gd, Tb, Dy, Ho, Er, Tm, Yb and Lu; and b and y are numbers satisfying the conditions of $0 < b \leqq 10.0$ and $10^{-6} \leqq y \leqq 1.8 \times 10^{-1}$, respectively, as described in Japanese Patent Application No. 60(1985)-78035.

Among the above-described stimulable phosphors, the divalent europium activated alkaline earth metal halide phosphor and rare earth element activated rare earth oxyhalide phosphor are particularly preferred, because these phosphors show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

The phosphor layer can be formed on the support, for instance, by the following procedure.

In the first place, stimulable phosphor particles and a binder are added to an appropriate solvent, and then they are mixed to prepare a coating dispersion comprising the phosphor particles homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the stimulable phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), prefereably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of the support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu m$ to 1 mm, and preferably from 50 to 500 $\mu m$.

The phosphor layer can be provided onto the support by the methods other than that given in the above. For instance, the phosphor layer is initially prepared on a sheet (false support) such as a glass plate, metal plate or plastic sheet using the aforementioned coating dispersion and then thus prepared phosphor layer is superposed on the genuine support by pressing or using an adhesive agent.

On the surface of the phosphor layer not facing the support, a transparent protective film is provided to protect the phosphor layer from physical and chemical deterioration.

The protective film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 3 to 20 $\mu m$.

On the transparent protective film is provided a thin film comprising an inorganic material, which is a characteristic requisite of the present invention.

In the radiation image storage panel of the invention, the thin film comprises at least one inorganic compound such as an inorganic fluoride, an inorganic oxide, an inorganic nitride or an inorganic carbide, Examples of the inorganic compound employable in the invention includes fluorides such as $MgF_2$, $CaF_2$, $BaF_2$ and cryolite; oxides such as MgO, CaO, $B_2O_3$, $Al_2O_3$, $ZrO_2$, $TiO_2$, SiO, $SiO_2$, ZnO, $In_2O_3$, $SnO_2$ and ITO (mixed crystal of $In_2O_3$ and $SnO_2$); nitrides such as BN and $Si_3N_4$; and carbides such as SiC, TiC and WC. When a thin film is formed on the protective film by using any of these compounds, hardness of the panel surface can be enhanced.

The above-described inorganic compounds are given by no means to restrict the inorganic compound employable in the invention. Any other inorganic compound can be also employed, provided that the thin film thereof can give high hardness to the panel surface to prevent the damage on the panel surface. From the viewpoint of the enhancement of the sensitivity of the panel, preferred is an inorganic compound capable of well transmitting a radiation such as X-rays and an electromagnetic wave (stimulating rays) such as visible light or infrared rays.

The thin film comprising the above-described inorganic compound can be formed on the surface of the protective film by methods such as vacuum deposition and sputtering process. Otherwise, the thin film may be formed on the surface of the support when stimulating rays are applied to the panel from the support-side surface.

The provision of the thin film on the protective film-side surface of the radiation image storage panel as described above according to the invention can effectively prevent the occurence of damage such as scratches on the surface of the panel to which stimulating rays are applied, whereby the deterioration of image quality can be prevented.

From the viewpoint of the improvement in the resistance to damage, the inorganic compound is preferably $MgF_2$, $CaF_2$, $BaF_2$, cryolite, MgO, CaO, $B_2O_3$, ZnO, $In_2O_3$, $SnO_2$, ITO, BN, $Si_3N_4$, SiC, TiC or WC. Among these compounds, the nitrides and carbides are particularly preferred. The thin film comprising the above-mentioned compound (which may be called a "damage-resistant film") preferably has a thickness within the range of 500 to 20,000 angstrom.

Further, from the viewpoint of the improvement in the anti-reflection, the inorganic compound is preferably a fluoride such as $MgF_2$, $CaF_2$ or cryolite; or an oxide such as $Al_2O_3$, $ZrO_2$, $TiO_2$, SiO or $SiO_2$. Any of these compounds has a low reflectance for stimulating rays to excite the stimulable phosphor in the panel, that is, the compound has a low reflectance for the electromagnetic wave in the wavelength region of the excitation thereof. Further, the compound has a low absorption coefficient for the stimulating rays, namely has a high transmittance therefor. The thin film comprising said compound (which may be called an "anti-reflecting film") preferably has a thickness in such an order as the wavelength of the stimulating rays. Particularly preferable is an optical thickness of odd times $\frac{1}{4}$ of the wavelength of the stimulating rays (thickness being equal to $n\ \lambda/4$ wherein $n=1, 3, 5, \ldots$, when $\lambda$ represents the wavelength), which provides a noticeably low reflectance to the thin film. The anti-reflecting film may comprises multiple layers, whereby a reflectance thereof is more decreased. Each layer of the multiple film basically has a thickness of the odd times $\frac{1}{4}$ of the wavelength, but the anti-reflecting film may be a transmissive multiple film in which each layer has a thickness deviated from the odd times $\frac{1}{4}$ of the wavelength. The thickness of the anti-reflecting film is generally within the range of 10 to 1,000 angstrom.

The provision of the anti-reflecting film on the protective film-side surface of the radiation image storage panel according to the invention brings about the high effectiveness of the stimulating rays to the panel. Even when the stimulating rays have a low intensity, the panel shows a high sensitivity. Further, the reduction of the reflection of the stimulating rays on the panel surface decreases the double reflection thereof and prevent the accuracy of read-out from lowering.

Otherwise, from the viewpoint of the improvement in the antistatic property, the inorganic compound is preferably a conductive oxide such as ZnO, $In_2O_3$, $SnO_2$ or ITO(mixed crystal of $In_2O_3$ and $SnO_2$). Any of these compounds has a high conductivity and a thin film thereof provides the antistatic effect to the panel. The thin film comprising the above-mentioned compound (which may be called an "antistatic film") preferably has a thickness within the range of 100 to 5,000 angstrom.

The provision of the antistatic film on the protective film-side surface of the radiation image storage panel according to the invention can improve the transfer characteristics and effectively prevent deposit of the dust to the panel surface, whereby the lowering of the image quality can be prevented.

The radiation image storage panel of the invention may be colored with a colorant to enhance the sharpness of the resulting image as described in U.S. Pat. No. 4,394,581 and U.S. patent application Ser. No. 326,642, now U.S. Pat. No. 4,491,736. For the same purpose, the phosphor layer of the radiation image storage panel may contain a white powder as described in U.S. Pat. No. 4,350,893.

The following examples further illustrate the present invention, but these examples are by no means understood to restrict the invention.

EXAMPLE 1

To a mixture of a particulate divalent europium activated barium fluorobromide ($BaFBr:0.001Eu^{2+}$) phosphor and a linear polyester resin were added successively methyl ethyl ketone and nitrocellulose (nitration degree: 11.5%), to prepare a dispersion containing the phosphor particles. Subsequently, tricresyl phosphate, n-butanol and methyl ethyl ketone were added to the dispersion. The mixture was sufficiently stirred by means of a propeller agitator to obtain a homogeneous coating dispersion having a mixing ratio of 1:10 (binder:phosphor, by weight) and a viscosity of 25–35 PS (at 25° C.).

The coating dispersion was applied evenly onto a polyethylene terephthalate sheet (support, thickness: 250 μm) placed horizontally on a glass plate. The application of the coating dispersion was carried out using a doctor blade. After the coating was complete, the support having a layer of the coating dispersion was placed in an oven and heated at a temperature gradually rising from 25° to 100° C. Thus, a phosphor layer having a thickness of approx. 250 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Subsequently, titanium carbide (TiC) was deposited on the transparent protective film in a thickness of approx. 2,000 angstrom by sputtering, to form a thin film comprising TiC (damage-resistant film) on the protective film.

Thus, a radiation image storage panel consisting essentially of a support, a phosphor layer, a transparent protective film and a thin film of TiC was prepared.

COMPARISON EXAMPLE 1

The procedure of Example 1 was repeated except for not forming a thin film of TiC on the protective film, to prepare a radiation image storage panel consisting essentially of a support, a phosphor layer and a transparent protective film.

EVALUATION

The radiation image storage panels prepared in Example 1 and Comparison Example 1 were evaluated on the occurrence of scratches according to the following test.

A strip of polyethylene terephthalate sheet which was the same material as that of the support of the radiation image storage panel was placed on the protective film-side surface of the panel (surface of the thin film of TiC or surface of the protective film), and the strip and the panel was rubbed against each other.

It was confirmed from the result of the test that the radiation image storage panel of the present invention (Example 1) showed prominently low occurrence of scratches on the protective film-side surface as compared with the conventional radiation image storage panel (Comparison Example 1).

EXAMPLE 2

A phosphor layer and a transparent protective film were provided on a support in the same manner as described in Example 1.

Subsequently, magnesium fluoride ($MgF_2$) was deposited on the transparent protective film in a thickness of approx. 1,580 angstrom [¼ of the wavelength (632.8 nm) of a He-Ne laser] by vaccum deposition, to form a thin film comprising $MgF_2$ (anti-reflecting film) on the protective film.

Thus, a radiation image storage panel consisting essentially of a support, a phosphor layer, a transparent protective film and a thin film of $MgF_2$ was prepared.

EVALUATION

The radiation image storage panels prepared in Example 2 and Comparison Example 1 were evaluated on the surface reflectance. The reflectance of the protective film-side surface of the panel is measured using a He-Ne laser (632.8 nm).

As the results, the radiation image storage panel of the present invention (Example 2) had a surface reflectance of approx. 4% and the conventional radiation image storage panel (Comparison Example 1) had a surface reflectance of approx. 1.5%. Accordingly, it was confirmed that the light reflection from the surface of the panel of the invention was remarkably reduced.

EXAMPLES 3-6

A phosphor layer and a transparent protective film were provided on a support in the same manner as described in Example 1.

Subsequently, each of the inorganic oxides set forth in Table 1 was deposited on the transparent protective film in a thickness of approx. 1,000 angstrom by sputtering, to form a thin film comprising the oxide (antistatic film) on the protective films.

Thus, a variety of radiation image storage panels consisting essentially of a support, a phosphor layer, a transparent protective film and a thin film of oxide were prepared.

EVALUATION

The radiation image storage panels prepared in Examples 3-6 and Comparison Example 1 were evaluated on electrical resistance of the panel surface according to the following test.

The radiation image storage panel was cut to give a test strip having a size of 110 mm×110 mm. The test strip was placed on a circular electrode (P-601 type, manufactured by Kawaguchi Electric Co., Ltd.) provided with an insulation resistance tester (EV-40 type super-insulation resistance tester, manufactured by the same) and then the voltage was set to measure the electric resistance of the surface (SR) of the test strip at a temperature of 23° C. and at a humidity of 50% RH. The obtained surface resistance is represented by logarithmic value (log SR).

The results are set forth in Table 1.

TABLE 1

| | Inorganic Compound | Surface Resistance (ohm) |
|---|---|---|
| Example | | |
| 3 | $In_2O_3$ | 7 |
| 4 | $SnO_2$ | 4 |
| 5 | ITO | 4 |
| 6 | ZnO | 8 |
| Com. Example | | |
| 1 | — | >15 |

As is evident from Table 1, the radiation image storage panels of the present invention (Examples 3-6) showed the prominently small surface resistances and the conductivities thereof were low. On the other hand, the conventional radiation image storage panel (Comparison Example 1) showed the large surface resistance and the conductivity thereof was high.

We claim:

1. A radiation image storage panel comprising a support, a phosphor layer which comprises a binder and a stimulable phosphor dispersed therein and a protective film, superposed in this order, characterized in that a thin film comprising an inorganic compound selected from the group consisting of inorganic nitrides, inorganic carbides, inorganic oxides, and inorganic fluorides, all having a property of being resistant to damage is provided on a surface of the panel.

2. The radiation image storage panel as claimed in claim 1, in which said thin film is provided on the protective film-side surface of the panel.

3. The radiation image storage panel as claimed in claim 1, in which said thin film having the property of resistance to damage comprises at least one inorganic compound selected from the group consisting of inorganic nitrides and inorganic carbides.

4. The radiation image storage panel as claimed in claim 1, in which said thin film having the property of resistance to damage has a thickness ranging from 500 to 20,000 angstrom.

5. The radiation image storage panel as claimed in claim 1, in which said thin film comprises an inorganic fluoride or an inorganic oxide, and has an anti-reflecting property.

6. The radiation image storage panel as claimed in claim 5, in which said thin film having the anti-reflecting property comprises $MgF_2$.

7. The radiation image storage panel as claimed in claim 5, in which said thin film having the anti-reflecting property has a thickness ranging from 10 to 1,000 angstrom.

8. The radiation image storage panel as claimed in claim 1, in which said thin film comprises a conductive inorganic oxide and has an antistatic property.

9. The radiation image storage panel as claimed in claim 8, in which said thin film having the antistatic property comprises at least one inorganic compound selected from the group consisting of $In_2O_3$, $SnO_2$ and ZnO.

10. The radiation image storage panel as claimed in claim 8, in which said thin film having the antistatic property has a thickness ranging from 100 to 5,000 angstrom.

* * * * *